(12) United States Patent
Yadav et al.

(10) Patent No.: US 11,954,077 B1
(45) Date of Patent: Apr. 9, 2024

(54) CRAWLER-LESS TIERING FOR CLOUD BASED FILE SYSTEMS

(71) Applicant: Dell Products L.P., Round Rock, TX (US)

(72) Inventors: Sunil Yadav, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/957,091

(22) Filed: Sep. 30, 2022

(51) Int. Cl.
*G06F 17/00* (2019.01)
*G06F 7/00* (2006.01)
*G06F 16/182* (2019.01)
*G06F 16/185* (2019.01)

(52) U.S. Cl.
CPC .......... *G06F 16/185* (2019.01); *G06F 16/183* (2019.01)

(58) Field of Classification Search
CPC .............................. G06F 16/185; G06F 16/183
USPC ......................................................... 707/825
See application file for complete search history.

(56) References Cited

U.S. PATENT DOCUMENTS

| | | | |
|---|---|---|---|
| 7,925,605 B1* | 4/2011 | Rubin | G06N 5/025 706/47 |
| 10,579,597 B1* | 3/2020 | Anand | G06F 16/289 |
| 10,817,203 B1* | 10/2020 | Anand | G06F 3/0647 |
| 11,093,448 B2* | 8/2021 | Dain | G06F 3/067 |
| 11,151,081 B1* | 10/2021 | Anand | G06F 16/13 |
| 2015/0263894 A1* | 9/2015 | Kasturi | H04L 41/0897 709/222 |
| 2017/0026684 A1* | 1/2017 | Shan | H04N 21/4122 |

* cited by examiner

*Primary Examiner* — Pavan Mamillapalli
(74) *Attorney, Agent, or Firm* — Chamberlain, Hrdlicka, White, Williams & Aughtry; Aly Z. Dossa

(57) ABSTRACT

In accordance with one or more embodiments of the invention, a method is provided for re-tiering files and folders located in a cloud-based file system without crawling all the files and folders in the cloud-based file system. The method utilizes the meta-data for the files and folders to determine, based upon provided rules, which tier a file or folder should be assigned to. By utilizing the meta-data, the use of expensive cloud resources may be minimized when there is a need for re-tiering the files and folders into appropriate cloud tiers.

20 Claims, 3 Drawing Sheets

US 11,954,077 B1

CRAWLER-LESS TIERING FOR CLOUD BASED FILE SYSTEMS

BACKGROUND

As people increasingly rely on computing systems and devices to perform many tasks; the systems have become increasingly complex, and the opportunities for failure and/or loss of important data has also increased. Increasingly data and IT needs are being migrated to external servers, storage, and service providers such as what is called the: "cloud." However, cloud-based storage frequently has different tiers of service which have different capabilities and prices. Managing which tier of service, a particular asset receives is needed to efficiently utilize cloud-based storage.

SUMMARY

In general, certain embodiments described herein relate to a method for automatically tiering files stored in a cloud storage environment. A local production host receives meta-data for the plurality of files stored in the cloud storage environment. At the same time, the local production host also obtains rules for assigning the plurality of files stored in the cloud storage environment, to a plurality of tiers of the cloud-based storage environment. Once the meta-data for the plurality of files and the rules for assigning the plurality of files are obtained, the local production host, analyzes the meta-data for the plurality of files stored in the cloud storage environment, and assigns, based on the rules, each of the plurality of files to one of the plurality of tiers of the cloud storage environment. The method then updates both the local meta-data and the meta-data for the plurality of files stored in the cloud storage environment to reflect the assigned one of the plurality of tiers of the cloud storage environment that each of the plurality of files stored in the cloud storage environment has been assigned to. At the same time, the updating triggers the reallocation of the files stored in the cloud storage environment to the assigned one of the plurality of tiers of the cloud storage environment.

In general, certain embodiments described herein relate to a non-transitory computer readable medium comprising computer readable program code, which when executed by a computer processor enables the computer processor to perform a method for automatically tiering files stored in a cloud storage environment. A local production host receives meta-data for the plurality of files stored in the cloud storage environment. At the same time, the local production host also obtains rules for assigning the plurality of files stored in the cloud storage environment, to a plurality of tiers of the cloud-based storage environment. Once the meta-data for the plurality of files and the rules for assigning the plurality of files are obtained, the local production host, analyzes the meta-data for the plurality of files stored in the cloud storage environment, and assigns, based on the rules, each of the plurality of files to one of the plurality of tiers of the cloud storage environment. The method then updates both the local meta-data and the meta-data for the plurality of files stored in the cloud storage environment to reflect the assigned one of the plurality of tiers of the cloud storage environment that each of the plurality of files stored in the cloud storage environment has been assigned to. At the same time, the updating triggers the reallocation of the files stored in the cloud storage environment to the assigned one of the plurality of tiers of the cloud storage environment.

In general, certain embodiments described herein relate to a system comprising: a cloud storage environment and a local production host. The local production host comprises a processor, a local storage device, and a memory. The memory includes instructions, which when executed by the processor, perform a method for automatically tiering files stored in a cloud storage environment. A local production host receives meta-data for the plurality of files stored in the cloud storage environment. At the same time, the local production host also obtains rules for assigning the plurality of files stored in the cloud storage environment, to a plurality of tiers of the cloud-based storage environment. Once the meta-data for the plurality of files and the rules for assigning the plurality of files are obtained, the local production host, analyzes the meta-data for the plurality of files stored in the cloud storage environment, and assigns, based on the rules, each of the plurality of files to one of the plurality of tiers of the cloud storage environment. The method then updates both the local meta-data and the meta-data for the plurality of files stored in the cloud storage environment to reflect the assigned one of the plurality of tiers of the cloud storage environment that each of the plurality of files stored in the cloud storage environment has been assigned to. At the same time, the updating triggers the reallocation of the files stored in the cloud storage environment to the assigned one of the plurality of tiers of the cloud storage environment.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
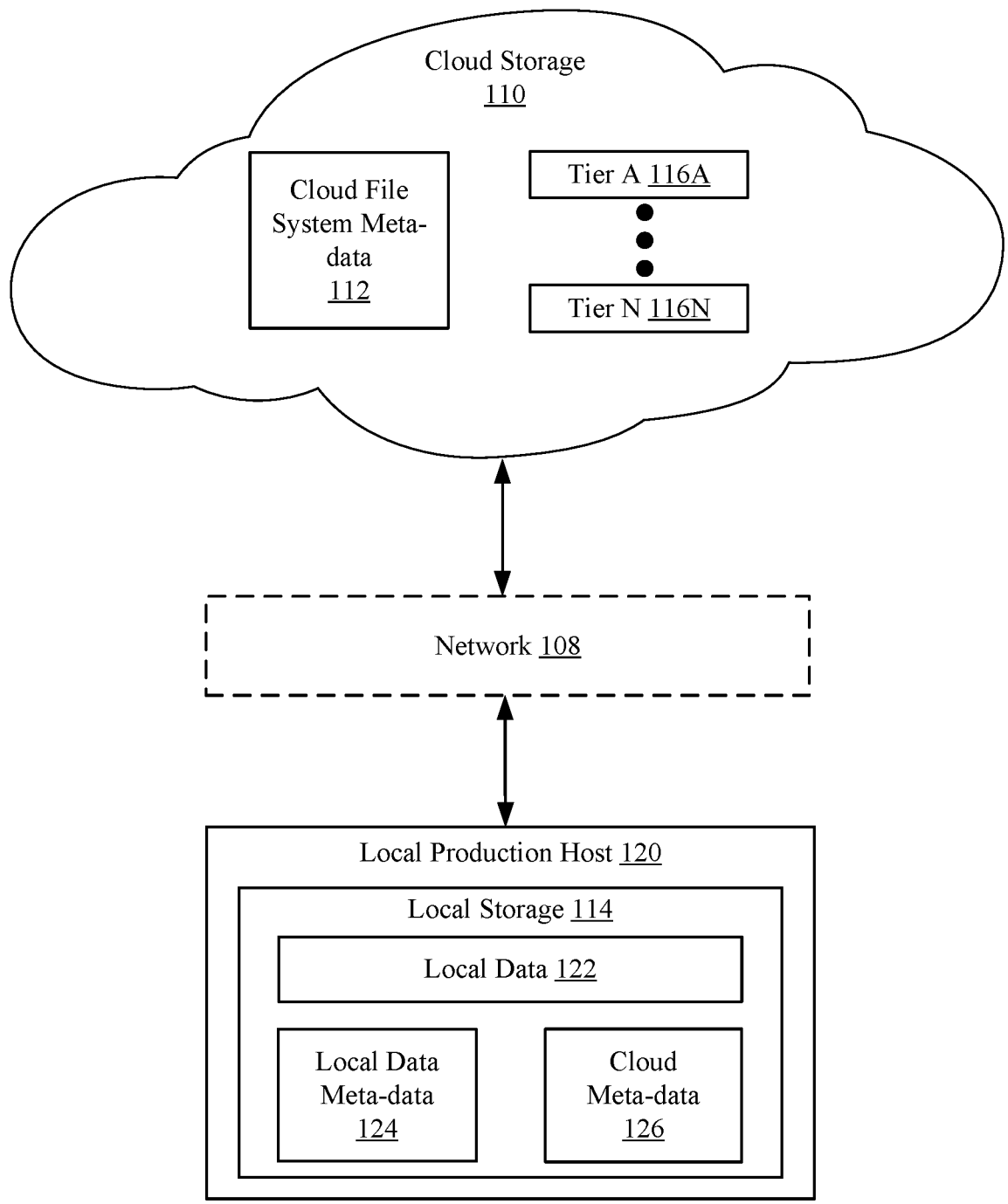
FIG. 1 shows a diagram of a cloud-based file-system in accordance with one or more embodiments of the invention.

Specific embodiments will now be described with reference to the accompanying figures.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected", or "operative connection", means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Cloud-based storage frequently has different tiers of service which have different capabilities and prices. For example, a cloud provider may provide three tiers: hot, cold, and archival, with the first tier provided much better performance but at a much higher price than the last tier. Managing which tier of service, a particular asset receives is needed to efficiently utilize cloud-based storage. One method of assigning a plurality of assets such as files to particular tiers, is by crawling the cloud's file-system to determine which files are present and their characteristics including use statistics. However, this is not a cost effective or efficient solution for managing to which tier to assign a particular file.

In accordance with one or more embodiments of the invention, instead of crawling the cloud-based storage environment's file system, the invention utilizes the file-system's meta-data to make determinations of which files are present and their characteristics. By utilizing the meta-data, the invention may make less file transfers (only the meta-data) and does not have to access all of the files in order to determine to which tier the files should be assigned. This may reduce cost as many cloud service providers charge per access/transfer. Further, it reduces the amount of network (e.g., 108) usage needed while being able to tier the assets/files/folders/data in a tier offering the appropriate level of performance while minimizing cost.

The following describes various embodiments of the invention.

FIG. 1 shows a diagram of a cloud-based file-system in accordance with one or more embodiments of the invention. The system includes cloud-based storage (e.g., 110) and a local production host (e.g., 120). The local production host (120) includes a local storage (e.g., 114) for storing local data (e.g., 122), and meta-data for both the local data (e.g., 124) and the cloud (e.g., 126). Each component may be operably connected to any of the other component via any combination of wired and/or wireless connections. Each component illustrated in FIG. 1 is discussed below.

In one or more embodiments of the invention, the system includes one or more local production hosts (e.g., 120). While only one local production host (e.g., 120) is shown, the local production host (e.g., 120) may be part of a group that may include more production hosts without departing from the invention. For example, a group could include three production hosts, at least sixteen production hosts, at least fifty production hosts, or at least a hundred production hosts without departing from the invention.

The local production host (e.g., 120) includes local storage (114) which stores assets such as local data (e.g., 122) and related meta-data (e.g., 124). The local storage (114) may also store a local copy of the meta-data (e.g., 126) for data stored on the cloud storage (e.g., 110). The local storage (114) on the local production host (e.g., 120) may include one or more processors, memory (e.g., random access memory), and persistent storage (e.g., disk drives, solid state drives, etc.). In one or more embodiments of the invention, the local storage (e.g., 114) may also or, alternatively, include off-site storage including but not limited to long-term storage such as tape drives, depending on the particular needs of the user and/or the system. The local storage (e.g., 114) that stores the local data (e.g., 122) may include individual local storage devices or contain shared storage such as a group shared volume (CSV) (not shown), which may be shared across multiple local production hosts (e.g., 120). Other types of storage may store the local data (e.g., 122).

In one or more embodiments of the invention, the production host (e.g., 120) performs workloads and provide services to clients and/or other entities not shown in the system illustrated in FIG. 1. The production host (e.g., 120) may further include the functionality to perform computer implemented services for users (e.g., clients). The computer implemented services may include, for example, database services, electronic mail services, data processing services, etc. The computer implemented services may include other and/or additional types of services without departing from the invention.

During the performance of the aforementioned services, data may be generated and/or otherwise obtained. The production host (e.g., 120) may store the data as local data (e.g., 122) or in the cloud storage (e.g., 110). The various data storage volumes (e.g., 110 and 122) provide various levels of performance and storing capabilities for the data used and/or produced by the production host (e.g., 120). Performing data storage services may include storing, modifying, obtaining, and/or deleting data. The data storage services may include other and/or additional services without departing from the invention.

Figure 3:
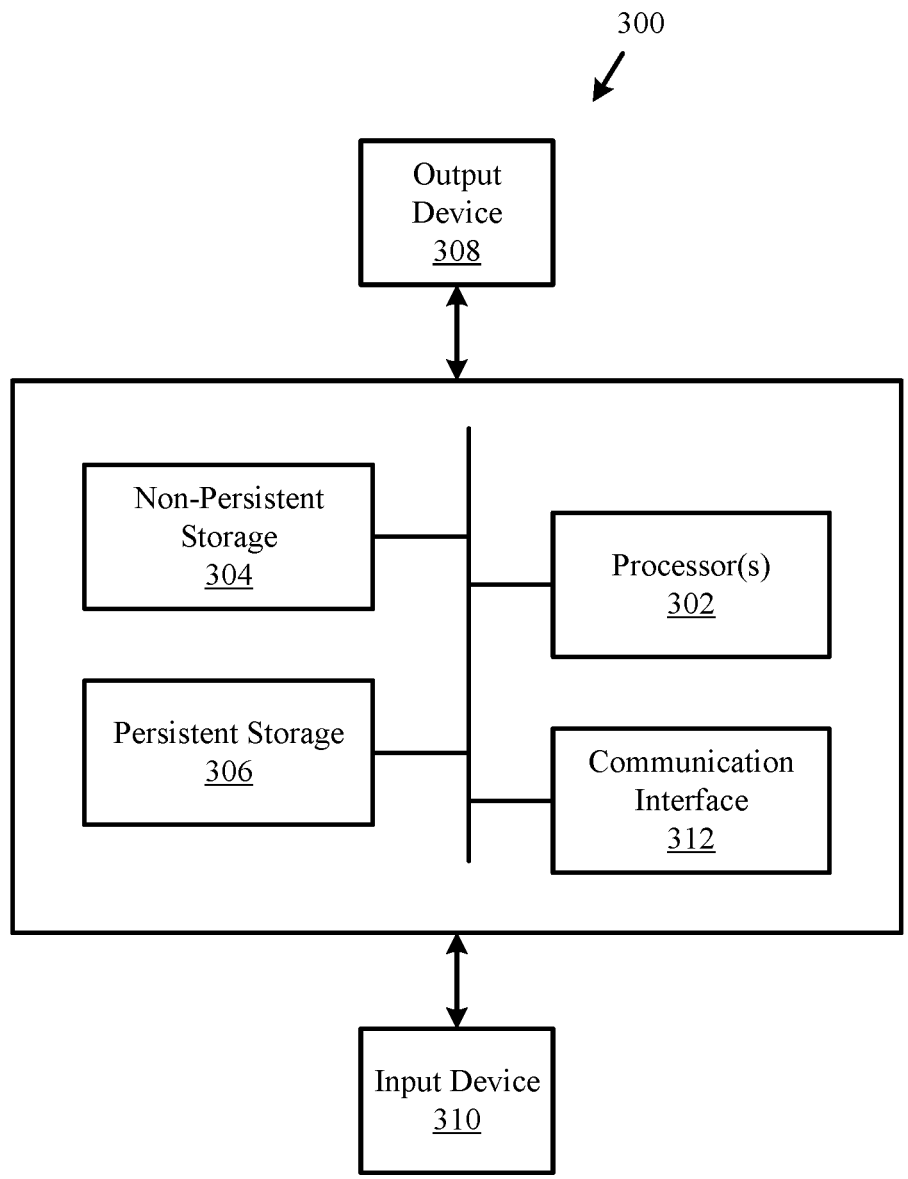
FIG. 3 shows a diagram of a computing device in accordance with one or more embodiments of the invention.

In one or more embodiments of the invention, the production host (e.g., 120) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (e.g., 120) described throughout this application.

In one or more embodiments of the invention, the production host (e.g., 120) is implemented as a logical device.

The logical device may utilize the computing resources of any number of computing devices and thereby provide the functionality of the production host (e.g., 120) described throughout this application.

The production host (e.g., 120) as well as other related components of the system perform data storage services. The data storage services may include storing, modifying, obtaining, and/or deleting data stored on both local production host (e.g., 120) and the cloud storage (e.g., 110) based on instructions and/or data obtained from the production hosts (e.g., 120) or other connected components. The data storage services may include other and/or additional services without departing from the invention. The local storage on the production host (e.g., 120) may include any number of storage volumes without departing from the invention.

The local production host (e.g., 120) may include storage devices (e.g., 114) for storing data. The storage devices (e.g., 114) may be physical storage devices and/or logical storage devices. The physical storage devices may include any combination of hard disk drives, solid state disk drives, tape drives, and/or any other physical storage mediums for the storage of data. The logical storage devices (e.g., virtualized storage) may utilize any quantity of hardware storage resources of any number of computing devices for storing data. For example, the local may utilize portions of any combination of hard disk drives, solid state disk drives, tape drives, and/or any other physical storage medium of any number of computing devices.

In one or more embodiments of the invention, the file system meta-data (124) is related to the local data (122). The file system meta-data (124) may provide such information as location or mapping data, descriptive data, administrative data, reference data, statistical data, and other types of data. The file system meta-data (124) may be used by the production host (120), a client (not shown), and/or backup agent (not shown) to discover and link the data with the appropriate application. As the local data (122) is changed over time, the meta-data (124), must change with it or the local data (122) will become increasingly hard to locate and use and the wrong data may be provided to an application.

The local production host (120) may additionally be connected through a network (e.g., 108) such as the Internet, to one or more cloud-based storage environments (110). The cloud-based storage environment (110) may be public or private (such as an internal or corporate cloud run by the owner of the production host (e.g., 120)).

In one or more embodiments of the invention, the network (e.g., 108) allows the local production host (120) to communicate with the cloud storage (e.g., 110) as well as other hosts, systems, and/or clients (not shown). The various components of the local production host (120) may also communicate with each other through a network (e.g., 108). The network (e.g., 108) may be a high-speed internal network and/or include part of an external network.

A network (e.g., 108) may refer to an entire network or any portion thereof (e.g., a logical portion of the devices within a topology of devices). A network (e.g., 108) may include a data center network, a wide area network (WAN), a local area network (LAN), a wireless network, a cellular phone network, and/or any other suitable network that facilitates the exchange of information from one part of the network (e.g., 108) to another. A network (e.g., 108) may be located at a single physical location or be distributed at any number of physical sites. In one or more embodiments, the network (e.g., 108) may be coupled with or overlap, at least in part, with the Internet.

In one or more embodiments, the network (e.g., 108) may include any number of devices within any of the components of the system. In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

The network (e.g., 108) may connect the local production host (e.g., 120) to a cloud storage environment (e.g., 110). The cloud-based storage environment (110) may be public or private (such as an internal or corporate cloud run by the owner of the production host (e.g., 120)). The cloud-based storage environment (110) may include servers including host and internet-based storage. When the cloud-based storage environment is not commonly owned by the owner of the local production host (e.g., 120), the provider of the cloud-based storage environment provides different level of service and storage at different prices.

Frequently cloud-based storage environment providers, provide various levels of service based on service level agreement (SLAs). Each SLA tier generally has different costs as well various levels of quality of service (QoS). Based on the SLA and QoS a particular tier storing data (e.g., 116A-116N) may have various levels of availability (uptime, outages), reliability (guaranteed rate of successful response and minimum time between failures), performance (response time and deliver time guarantees), scalability (capacity fluctuations). Different tiers of service may have, for example, more availability but less scalability. Other tiers of services may have various levels of QoS.

With distinct levels of QoS, the cloud-based storage providers generally charge different rates. The cloud-based storage provides a fee for the amount of data stored in the cloud base environment, the amount of out-bound and or in-bound traffic between the cloud environment and local host, and the amount of other services or use of components provided. Depending on the tier (e.g., 116A-116N) that an asset is assigned to, these fees may be more or less. It is desirable to place an asset in the appropriate tier, however, since retrieving or sending an asset has added cost (due to fees on network traffic), it is desirable to move the assets back and forth as little as possible.

In one or more embodiments of the invention, the cloud file system meta-data (112) for the various files stored in the tiers (e.g., 116A-116N) and is utilized to make decisions on which tier (e.g., 116A-116N) to place the data without the need of transferring the actual data between the cloud and the local production host (e.g., 120). As will be described in more detail below with regards to the method shown in FIG. 2, when a user, administrator, or other concerned party or application, wishes to assign the files to different tiers (e.g., 116A-116N) such as, but not limited to, when a new tier of service becomes available or when a new file needs to be stored, the cloud file system meta-data (e.g., 112) is gathered and sent to the local production host (e.g., 120) via the network (e.g., 108). The received cloud file system meta-data is stored on the local production host in its storage device (e.g., 114) as cloud meta-data (e.g., 126) and is used to determine various predetermine characteristics of the data stored in the tiers (e.g., 116A-116N). Based on these characteristics and rules provided by a user or administrator, the local production host (e.g., 120) may then determine which tier (e.g., 116A-116N) a particular asset such as a file or folder should be assigned to.

Once the determination of what tier a particular asset such as a file or folder should be assigned to, the local production host (120), sends updated meta-data back to the cloud storage environment (e.g., 110), along with instructions to move or place the data into the appropriate tiers based on the updated meta-data. Periodically or when any assets change, the placement of the assets in the tiers (e.g., 116A-116N) may be updated, however since the local production host (e.g., 120) maintains a copy of the cloud meta-data (e.g., 126), in one or more embodiments of the invention, the local production host (e.g., 120) only needs to send updates without needing to retrieve a new copy of the cloud file system meta-data (e.g., 112) from the cloud storage (e.g., 110), further reducing the amount of data that needs to be transmitted between the cloud storage (e.g., 110) and the local production host (e.g., 120).

Figure 2:
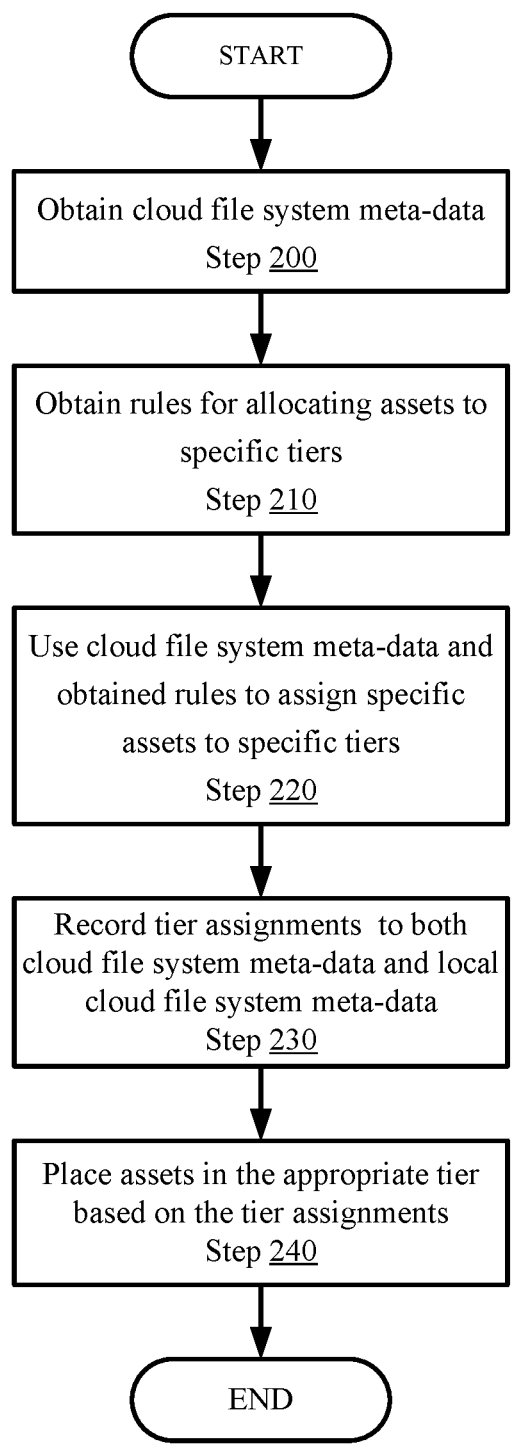
FIG. 2 shows a flowchart of a method for tiering a cloud-based file-system in accordance with one or more embodiments of the invention.

FIG. 2 shows a method for tiering a cloud-based filesystem in accordance with one or more embodiments of the invention. While the various steps in the method are presented and described sequentially, those skilled in the art will appreciate that some or all of the steps may be executed in different orders, may be combined, or omitted, and some or all of the steps may be executed in a parallel manner without departing from the scope of the invention. The method may be performed by, for example, the production host (e.g., 120, FIG. 1). Other components of the system illustrated in FIG. 1 may perform all, or a portion of the method of FIG. 2 without departing from the invention.

In step 200, the system obtains the cloud file system meta-data (e.g., 112, FIG. 1). The production host (e.g., 120, FIG. 1) or other related component of the system, may request cloud file system meta-data (e.g., 112, FIG. 1). The cloud file system meta-data may be obtained during a meta-data-based backup (MBB). In one or more alternative embodiments of the invention, the cloud file system meta-data (e.g., 112, FIG. 1) may already be present as a result of the normal operation of the cloud-based storage environment (e.g., 110, FIG. 1).

At the same time or after the cloud file system meta-data is obtained in step 200, rules for allocating files to specific tiers is obtained in step 210. In one or more embodiments of the invention, the rules may be stored in a configuration file in the local data (e.g., 122) that have been previously configured by a user or administrator.

Alternatively, in one or more embodiments of the invention, a user or administrator may be prompted to provide the rules. The user may be presented different options in a graphical user interface (GUI) or by other similar needs, which allows the user to customize the assignment of assets such as files and folders to specific tiers (e.g., 116A-116N). The rules may also be obtained from other locations including from the cloud storage environment and its provider, without departing from the invention.

The rules, in accordance with one or more embodiment of the invention, may be configured to provide optimized service for each asset without causing increased expense.

The rules may consider, for example, how often (frequency) an asset such as a file or folder is accessed. They may also consider the size of the asset and/or the type of file(s) comprising the asset.

For example, if the asset is a backup file for the local production host, it would be a large file that is not accessed much or at all. Accordingly, it may be desirable to maintain such a backup file in a lower tier of storage such as an archival tier, where the cost of storage of such a large file is lower than other tiers. Such a tier may have a lower cost for transferring the file or a low throughput when transferring the file. Because a backup file does not need to be retrieved frequently (or at all) a low QoS for retrieving the file may be adequate.

In another, a database that stores inventory numbers for the company's product may need to frequently be accesses. This should be assigned to the highest tier of storage, so that that it may be frequently accessed with a high throughput and is always available.

However, in another non-limiting example, a database that contains information that does not need to be access as much may be assigned to a middle tier. The middle tier may have high availability, but a slower throughput, along with reduced cost as compared to the higher tier. Other assignments and rules may be made and more then or less than three tiers of service may be used without departing from the invention.

Once the rules are obtained in step 210, the method proceeds to step 220, where the asset such as files and folders are assigned to specific tiers. As discussed above the tiers are assigned based on the rules with such criteria as the frequency of use of a particular asset, file type of the asset, the assets size, and other attributes from the file-system of the cloud-based storage environment (e.g., 110, FIG. 1). In one or more embodiments of the invention, there are at least three tiers to which the asset may be assigned. More or less tiers may be used without departing from the invention.

Once the assets, such as files and folders, are assigned to specific tiers, the method proceeds to step 230, where the tier assignments are recorded cloud meta-data (e.g., 126, FIG. 1), which is now updated cloud meta-data. The updated cloud meta-data is provided to the cloud storage environment (e.g., 110, FIG. 1). When the updated cloud meta-data (e.g., 112, FIG. 1) is received by the cloud storage environment (e.g., 110, FIG. 1) the cloud file-system meta-data is updated with the updated cloud metadata. The associated asset/data in the cloud storage (110) is redistributed to the appropriate tiers in step 240 based on the cloud file-system meta-data (112), which has been updated based on the updated cloud meta-data. Alternatively, step 240 may be triggered by a separate message being) sent from the local production host (120, FIG. 1) to the cloud storage to initiate the redistribution of the files and folders based on the cloud file-system meta-data (112), which has been updated based on the updated cloud meta-data.

At some later time, when the asset(s) have been assigned to the appropriate tiers, periodically or as a result in a change in the rules or data, the files and folders that comprise the asset may be reallocated to different tiers. This may be done as a result of new data being uploaded or changes being made to the data on the cloud-based storage environment. Alternatively, in one or more embodiments of the invention, a user or administrator may desire to change the rules for assigning the assets (files and folders) to different tiers, in order to obtain better performance, reduce costs, or for other reasons. In yet another one or more embodiments of the invention, the cloud-based storage environment providers may be to provide an additional tier(s) of service, that a user wished to take advantage of and therefore reallocates the assets.

The data stored in the tiers (e.g., 116A-116N) may be monitored periodically as specified by a user or administrator. This monitoring may be performed, for example, once every day, week, etc. The frequency of the monitoring may be any frequency that ensures that the data is properly placed. Alternatively, where the data stored in the tiers (e.g., 116A-116N) changes frequently, the local production host (e.g., 120) may monitor the data continuously.

Once it is determined that files or folders that comprise the asset need to be reallocated to different tiers using the method describe in FIG. 2.

The method may end following step 260.

Additionally, as discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of cloud-based storage. By utilizing the meta-data, the invention may make less file transfers (only the meta-data) and not have to access all of the files in order to determine which tier they should be assigned to. This may reduce cost as many cloud service provides charge per access/transfer. Further it reduces the amount of network (e.g., 108) usage needed while being able to tier the files/asset in a tier offering the appropriate level of performance while minimizing cost.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for automatically tiering files stored in a cloud storage environment, the method comprising:
   receiving, by a local production host from the cloud storage environment, cloud file system meta-data for a plurality of files stored in the cloud storage environment;
   storing, at the local production host, the cloud file system meta-data as local cloud meta-data;
   obtaining, by the local production host from the cloud storage environment, rules based on local data or provided by a user for assigning the plurality of files stored in the cloud storage environment to a plurality of tiers in the cloud storage environment;
   analyzing, by the local production host, the local cloud meta-data for the plurality of files stored in the cloud storage environment;
   assigning, based on the analyzing and the rules for assigning, each of the plurality of files to one of the plurality of tiers of the cloud storage environment to obtain tier assignments;
   recording the tier assignments to the local cloud meta-data to obtain updated local cloud meta-data; and
   providing the updated local cloud meta-data to the cloud storage environment, wherein the providing is configured to trigger in the cloud storage environment:
      updating the cloud file system meta-data to include the tier assignments; and
      reallocating the plurality of files stored in the cloud storage environment based on the tier assignments.

2. The method of claim 1, further comprising:
   analyzing, by the local production host, the updated local cloud meta-data for the plurality of files stored in the cloud storage environment;
   assigning, based on the analyzing and the rules for assigning, each of the plurality of files to one of the plurality of tiers of the cloud storage environment to obtain second tier assignments;
   recording the second tier assignments to the updated local cloud meta-data to obtain second updated local cloud meta-data; and
   providing the second updated local cloud meta-data to the cloud storage environment.

3. The method of claim 1, the method further comprising:
   receiving new rules for assigning the plurality of files;
   re-assigning, based on the new rules for assigning, each of the plurality of files to one of the plurality of tiers of the cloud storage environment to obtain second tier assignments; and recording the second tier assignments to the updated local cloud meta-data to obtain second updated local cloud meta-data; and providing the second updated local cloud meta-data to the cloud storage environment, wherein the providing is configured to trigger in the cloud storage environment:
updating the cloud file system meta-data to include the second tier assignments; and
reallocating the plurality of files stored in the cloud storage environment based on the second tier assignments.

4. The method of claim 1, wherein the plurality of tiers includes at least three tiers.

5. The method of claim 1, wherein each of the plurality of tiers has a different throughput and cost.

6. The method of claim 1, wherein the rules include assigning each of the plurality of files to one of the plurality of tiers of the cloud storage environment based on at least when a file was uploaded and/or last modified.

7. The method of claim 1, wherein the rules include assigning each of the plurality of files to one of the plurality of tiers of the cloud storage environment based on at least on a frequency that a file has been accessed and/or modified.

8. A non-transitory computer readable medium comprising computer readable program code, which when executed by a computer processor enables the computer processor to perform a method for automatically tiering files stored in a cloud storage environment, the method comprising:
receiving, by a local production host from the cloud storage environment, cloud file system meta-data for a plurality of files stored in the cloud storage environment;
storing, at the local production host, the cloud file system meta-data as local cloud meta-data;
obtaining, by the local production host from the cloud storage environment, rules based on local data or provided by a user for assigning the plurality of files stored in the cloud storage environment to a plurality of tiers in the cloud storage environment;
analyzing, by the local production host, the local cloud meta-data for the plurality of files stored in the cloud storage environment;
assigning, based on the analyzing and the rules for assigning, each of the plurality of files to one of the plurality of tiers of the cloud storage environment to obtain tier assignments;
recording the tier assignments to the local cloud meta-data to obtain updated local cloud meta-data; and
providing the updated local cloud meta-data to the cloud storage environment, wherein the providing is configured to trigger in the cloud storage environment:
updating the cloud file system meta-data to include the tier assignments; and
reallocating the plurality of files stored in the cloud storage environment based on the tier assignments.

9. The non-transitory computer readable medium of claim 8, wherein the method further comprises:
analyzing, by the local production host, the updated local cloud meta-data for the plurality of files stored in the cloud storage environment;
assigning, based on the analyzing and the rules for assigning, each of the plurality of files to one of the plurality of tiers of the cloud storage environment to obtain second tier assignments;
recording the second tier assignments to the updated local cloud meta-data to obtain second updated local cloud meta-data; and
providing the second updated local cloud meta-data to the cloud storage environment.

10. The non-transitory computer readable medium of claim 8, wherein the method further comprises:
receiving new rules for assigning the plurality of files;
re-assigning, based on the new rules for assigning, each of the plurality of files to one of the plurality of tiers of the cloud storage environment to obtain second tier assignments; and
recording the second tier assignments to the updated local cloud meta-data to obtain second updated local cloud meta-data; and
providing the second updated local cloud meta-data to the cloud storage environment, wherein the providing is configured to trigger in the cloud storage environment:
updating the cloud file system meta-data to include the second tier assignments; and
reallocating the plurality of files stored in the cloud storage environment based on the second tier assignments.

11. The non-transitory computer readable medium of claim 8, wherein the plurality of tiers includes at least three tiers.

12. The non-transitory computer readable medium of claim 8, wherein each of the plurality of tiers has a different throughput and cost.

13. The non-transitory computer readable medium of claim 8, wherein the rules include assigning each of the plurality of files to one of the plurality of tiers of the cloud storage environment based on at least when a file was uploaded and/or last modified.

14. The non-transitory computer readable medium of claim 8, wherein the rules include assigning each of the plurality of files to one of the plurality of tiers of the cloud storage environment based on at least on a frequency that a file has been accessed and/or modified.

15. A system comprising:
a cloud storage environment; and
a local production host which comprises of:
a processor; and
a memory comprising instructions, which when executed by the processor, performs a method for automatically tiering files stored on the cloud storage environment, the method comprising:
receiving, by a local production host from the cloud storage environment, cloud file system meta-data for a plurality of files stored in the cloud storage environment;
storing, at the local production host, the cloud file system meta-data as local cloud meta-data;
obtaining, by the local production host from the cloud storage environment, rules based on local data or provided by a user for assigning the plurality of files stored in the cloud storage environment to a plurality of tiers in the cloud storage environment;
analyzing, by the local production host, the local cloud meta-data for the plurality of files stored in the cloud storage environment;
assigning, based on the analyzing and the rules for assigning, each of the plurality of files to one of the plurality of tiers of the cloud storage environment to obtain tier assignments;
recording the tier assignments to the local cloud meta-data to obtain updated local cloud meta-data; and providing the updated local cloud meta-data to the cloud storage environment, wherein the providing is configured to trigger in the cloud storage environment:
   updating the cloud file system meta-data to include the tier assignments; and
   reallocating the plurality of files stored in the cloud storage environment based on the tier assignments.

16. The system of claim 15, wherein the method further comprising:
   analyzing, by the local production host, the updated local cloud meta-data for the plurality of files stored in the cloud storage environment;
   assigning, based on the analyzing and the rules for assigning, each of the plurality of files to one of the plurality of tiers of the cloud storage environment to obtain second tier assignments;
   recording the second tier assignments to the updated local cloud meta-data to obtain second updated local cloud meta-data; and
   providing the second updated local cloud meta-data to the cloud storage environment.

17. The system of claim 15, wherein the method further comprises:
   receiving new rules for assigning the plurality of files;
   re-assigning, based on the new rules for assigning, each of the plurality of files to one of the plurality of tiers of the cloud storage environment to obtain second tier assignments; and
   recording the second tier assignments to the updated local cloud meta-data to obtain second updated local cloud meta-data; and
   providing the second updated local cloud meta-data to the cloud storage environment, wherein the providing is configured to trigger in the cloud storage environment:
      updating the cloud file system meta-data to include the second tier assignments; and
   reallocating the plurality of files stored in the cloud storage environment based on the second tier assignments.

18. The system of claim 15, wherein the plurality of tiers includes at least three tiers.

19. The system of claim 15, wherein each of the plurality of tiers has a different throughput and cost.

20. The system of claim 15, wherein the rules include assigning each of the plurality of files to one of the plurality of tiers of the cloud storage environment based on at least when a file was uploaded and/or last modified.

* * * * *